United States Patent Office 2,716,074
Patented Aug. 23, 1955

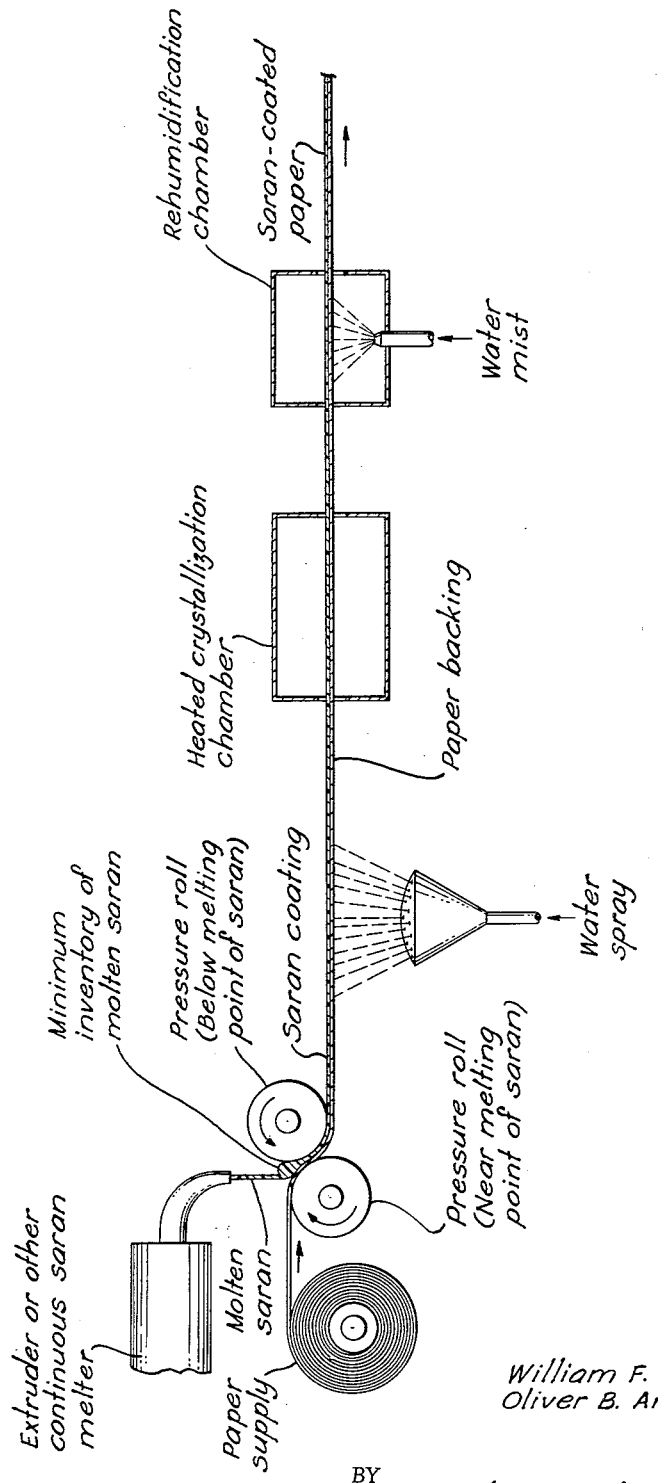

2,716,074

METHOD OF COATING PAPER WITH CRYSTALLINE SARANS

William F. Mick, Midland, and Oliver B. Amley, Sanford, Mich., assignors to The Dow Chemical Company, Midland, Mich., a corporation of Delaware Application August 20, 1951, Serial No. 242,794

3 Claims. (Cl. 117—65)

This invention relates to a method for applying to paper a uniform coating of a molten but normally crystalline saran. It relates in particular to such a method in which the extreme tendency to curl, normally exhibited by a saran melt coated paper, is minimized.

The term saran is a generic name for the polymer of vinylidene chloride and for copolymers containing this material. Those in which vinylidene chloride predominates are substantially insoluble in common solvents and can only be formed into thin films by thermal methods. Due to their inertness to solvents and chemicals, it is conceivable that such sarans could be used advantageously to coat paper which would then be useful in contact with materials which adversely affect more soluble coatings. Unfortunately, however, the sarans in which vinylidene chloride predominates have a short thermal life. That is, after a rather short exposure of these sarans to temperatures near or above their melting points, they begin to decompose. Continued or repeated exposure to such temperatures causes accelerated degradation. Thus, the more common techniques for applying molten coatings to paper are not available in the case of the high vinylidene chloride polymers, especially those methods which maintain a large body of the molten material for use in the coating operation.

It is now well recognized that the sarans which contain a preponderant proportion of vinylidene chloride are normally crystalline, i. e., their X-ray diffraction patterns clearly show that they are crystalline except when they are molten and for a short period after they have been cooled from the molten condition. The present invention is concerned with the use of the normally crystalline sarans in coating paper, and especially is it concerned with such use of a copolymer of 88 to 94 per cent vinylidene chloride and 12 to 6 per cent vinyl chloride.

It is an object of the present invention to provide a method whereby paper may be coated continuously with a molten but normally crystalline vinylidene chloride polymer. A particular object is to provide such a method in which the thermal exposure of the polymer is insufficient to cause degradation. Another object is to provide such a method in which the tendency for saran melt coated paper to curl is substantially overcome. Further objects may appear hereinafter.

The method of the invention comprises continuously melting a normally crystalline saran, supplying it continuously to a pressure zone and as nearly as possible at the rate at which it is used to coat paper, simultaneously feeding a strip of paper to said pressure zone, bringing the paper and the molten polymer continuously into contact across the face of the paper sheet, pressing the polymer to a uniform thickness on said sheet, promptly spraying the uncoated side of the paper with water while the polymer on the coated side is still non-crystalline, subjecting the so-treated sheet to a temperature at which the polymer crystallizes rapidly, for a time sufficient to crystallize the polymer, and, if desired, subjecting the uncoated side of the paper to a rehumidification treatment to restore a normal moisture content to the sheet. The process of the invention is illustrated diagrammatically in the accompanying drawing.

It is essential to the success of the method that the polymer be melted continuously and fed to the paper coating apparatus at a rate substantially equal to the rate at which it is used to coat paper. It is also essential that there be no more than a minimum inventory of molten polymer at any point in the system. After emerging from an extruder, the polymer should not remain molten for over an additional 2 minutes, and even shorter exposures to melting temperatures are preferred. To meet this requirement, it is preferred that the polymer be fed from an extruder, in which it is melted, to the nip of a pair of pressure rolls over one of which the paper web is drawn. The roll speed is adjusted so that the rate of takeaway of the polymer on the paper nearly balances the rate of feed from the extruder. In recognition of the inevitable momentary variations in the rate of discharge of polymer from the extruder, a small inventory of polymer is carried in the nip of the coating rolls, but this amount is limited to a quantity which would only last for about one-third minute to one minute if the extruder were to cease functioning.

The coating rolls are spaced apart a distance just sufficient to permit passage of the paper with the desired thickness of polymer thereon, and they thus serve as coating, doctor and pressure rolls to smooth the coating on the paper. To prevent the molten polymer from sticking to the roll with which it is directly in contact, this roll is maintained at a temperature (often about 25 centigrade degrees) below the melting point of the polymer, while the roll against which the paper is fed is kept nearer the polymer melting point. To minimize the tendency for the coated sheet to curl, it is sprayed with an excess of water on its uncoated side soon after leaving the coating rolls and before the polymer has changed from its temporarily non-crystalline condition to its normal crystalline one. If significant recrystallization has occurred before water is used, the water spray does not prevent or overcome the tendency to curl.

In order to obtain the most desirable properties in the coated sheet it has been found undesirable to permit the polymer on the coated sheet to reacquire its crystalline condition by a normal aging process at ordinary temperatures. Recrystallization by normal aging is not uniform throughout the polymeric body, and the product may continue to change properties as crystallization progresses over a protracted period of time. Furthermore, during most of the period while the coating is temporarily non-crystalline it is tacky and, if the coated sheet should be wound on a storage roll the coated face blocks on the uncoated face which is pressed against it. Hence, following the treatment of the coated paper with a spray of water, the sheet is conveyed through a heating zone, such as an oven, in which the non-crystalline polymer is subjected to a temperature, suitably between 55° and 115° C., which is known to induce accelerated recrystallization of the polymer. It has been found that recrystallization of the polymer on the paper sheet is sufficiently complete to eliminate tackiness and danger of blocking in from 10 to 20 seconds at temperatures of 75° to 95° C., and that a sufficient time at 55° C. is about one minute.

After the sheet of coated paper has passed through the crystallization zone it will be found to have little tendency to curl, provided it was sprayed with water before the polymer was recrystallized. It may be desirable to replace some of the moisture lost in the heating zone, and for this purpose the sheet may be sprayed again on its uncoated side with a fine mist of water. All that is required or desired at this point is to restore the normal moisture content of the sheet.

The invention has been described with reference to a process in which the polymer is fed from an extruder to a single pair of coating rolls and is there applied directly to the paper. It is to be understood that other systems may be used, provided the same precautions are observed to prevent decomposition of the polymer and sticking of the polymer to the feed rolls. Thus, the polymer may be extruded into the nip between two rolls and sheeted from these rolls at the desired thickness onto another roll where it is calendered onto the paper while still in the tacky and substantially molten condition. Similarly, the polymer may be melted in a continuous manner at the desired rate in apparatus other than an extruder, and supplied as a molten strip to paper which is then subjected to the pressure and smoothing action of a set of smooth rolls.

In a specific example, a sheet of kraft paper of 50 pounds basis weight, about 5 mils thick and 20 inches wide, is fed continuously through the nip of a pair of smooth rolls, the one adjacent the paper being heated to 315° F. (157° C.) while the bare roll is kept at 265° F. (130° C.). A plasticized, normally crystalline copolymer of about 90 per cent vinylidene chloride and 10 per cent vinyl chloride, the fusion temperature of which is about 170° C. in its plasticized condition, is extruded as nearly as possible at a steady rate of 200 pounds per hour from an internally heated extruder having a high melting and throughput capacity. The molten polymer is deposited from the extruder orifice in the nip of the rolls mentioned above. These rolls are spaced apart a sufficient distance to provide a coating thickness of 0.002 inch. About 1.7 pounds of molten polymer is kept in the nip of the rolls to serve as a rolling inventory as protection against momentary variations in output of the extruder. This inventory is sufficient only for 0.5 minute of operation if the extruder output should be stopped. The rolls are turned at a peripheral speed of about 115 feet per minute, and the coated paper is taken away at that linear speed. About 3 feet beyond the coating rolls, water is sprayed on the uncoated side of the sheet in amount sufficient to saturate the paper, which is then drawn over an idler roll to squeeze out and wipe off the excess water. The coating is still very tacky and is non-crystalline at this point, being in the condition sometimes referred to as the supercooled state. The coated sheet is advanced at the same linear rate over festoon guide rolls in a hot air convection oven kept at 190° F. (88° C.) for a distance of 20 feet, this treatment requiring about 10.5 seconds. The coating is now found to be crystalline, by X-ray diffraction methods. The paper, which has become quite dry in the oven, exhibits no objectionable tendency to curl. When the water treatment is omitted following the coating operation, or when it is applied only after the recrystallization step, the paper continues to curl badly. To restore the normal moisture content of the coated paper, it may be sprayed on its uncoated side with a fine mist of water, and is finally wound in rolls of standard length. The coating is non-blocking at any temperature to which the paper will be exposed in normal storage, but may be sealed to other similarly coated sheets, or to uncoated paper, or to unsupported saran films of similar composition, with the aid of known sealing devices, when the coating is heated to a temperature at or above its melting point. The coating is smooth and impervious to moisture, and has the typical resistance of the crystalline sarans to oils, fats, solvents and the like.

The invention has been illustrated with reference to the coating of kraft paper of 50 pound basis weight with a crystalline copolymer of vinylidene and vinyl chloride at 0.002 inch coating thickness. Any paper may be used which is strong enough to carry the added weight of hot molten polymer in the short interval before the polymer is solidified and recrystallized. Any crystalline copolymer of vinylidene chloride with another monoethylenically unsaturated polymerizable compound may be used. The coating thickness employed will be varied to give the type of surface or the degree of protection desired. Polished or calendered papers and filled papers usually have fewer protruding fiber ends than others and a thinner coating will seal such papers effectively than in the case of uncalendered papers. Coating thicknesses may range from 0.0005 inch to 0.005 inch, or more, as desired.

We claim:

1. The method which comprises continuously melting a normally crystalline saran, supplying it continuously at the rate at which it is melted to a pressure zone, simultaneously feeding a strip of paper to said pressure zone, bringing the paper and the molten polymer continuously into contact across the face of the paper sheet, pressing the polymer to a uniform thickness on the sheet, taking the so-coated paper away from the pressure zone continuously and at such a rate that the polymer is used in coating at substantially the same rate as it is melted and supplied for that purpose, promptly wetting thoroughly the uncoated side of the paper with water while the polymer on the coated side is still amorphous, and subjecting the so-treated sheet to a temperature of at least 55° C. at which the polymer crystallizes rapidly, for a time sufficient to crystallize the polymer.

2. The method claimed in claim 1 wherein the coated and water-wet sheet is subjected to a temperature of 75° to 115° C. to effect recrystallization of the polymer.

3. The method which comprises melting normally crystalline saran, supplying it to a pressure zone, simultaneously feeding a strip of paper to said pressure zone, bringing the paper and the molten saran continuously into contact across the face of the paper sheet, pressing the polymer to a uniform thickness on the sheet, taking the so-coated paper away from the pressure zone, promptly wetting thoroughly the uncoated side of the paper with water while the saran on the coated side is still amorphous, and subjecting the so treated sheet to an elevated temperature at which the saran crystallizes rapidly, for a time sufficient to crystallize said saran.

References Cited in the file of this patent

UNITED STATES PATENTS

| Number | Name | Date |
|---|---|---|
| 1,960,266 | Jenkins | May 29, 1934 |
| 2,054,115 | Abrams | Sept. 5, 1936 |
| 2,070,600 | Jenett | Feb. 16, 1937 |
| 2,137,636 | Barrett | Nov. 22, 1938 |
| 2,222,956 | Seaton | Nov. 26, 1940 |
| 2,293,855 | Schneider | Aug. 25, 1942 |
| 2,329,571 | Wiley | Sept. 14, 1943 |
| 2,340,834 | Hanson | Feb. 1, 1944 |
| 2,391,619 | Doolittle | Dec. 25, 1945 |
| 2,392,972 | Cheyney | Jan. 15, 1946 |

FOREIGN PATENTS

| Number | Country | Date |
|---|---|---|
| 600,687 | Great Britain | Apr. 15, 1948 |